United States Patent [19]

Moriyama et al.

[11] 4,385,903
[45] May 31, 1983

[54] AGENT FOR PROMOTING FILTRATION DEHYDRATION OF METAL HYDROXIDE SLURRY

[75] Inventors: Noboru Moriyama, Utsunomiya; Takeshi Inoue, Ichikaimachi, both of Japan

[73] Assignee: Kao Soap Co., Ltd., Tokyo, Japan

[21] Appl. No.: 316,170

[22] Filed: Oct. 29, 1981

[30] Foreign Application Priority Data

Nov. 18, 1980 [JP] Japan .................. 55-162212

[51] Int. Cl.³ ..................... C02F 1/56; C01F 7/44
[52] U.S. Cl. ..................... 23/313 R; 210/716; 210/732; 210/772; 423/127; 423/592; 423/629
[58] Field of Search .............. 210/711, 716, 717, 725, 210/727, 728, 732, 768, 772; 423/122, 127, 592, 629; 23/313 R

[56] References Cited

U.S. PATENT DOCUMENTS

| | | | |
|---|---|---|---|
| 2,894,898 | 7/1959 | Oettinger | 423/629 |
| 3,020,229 | 2/1962 | Thompson | 210/732 |
| 3,020,230 | 2/1962 | Smith | 210/732 |
| 3,194,758 | 7/1965 | Lissant | 210/732 |
| 3,436,199 | 4/1969 | Silvernail | 210/732 |
| 3,798,160 | 3/1974 | Huffman | 423/629 |
| 4,009,103 | 2/1977 | Burke | 423/122 |
| 4,291,004 | 9/1981 | McCaffrey | 210/732 |

FOREIGN PATENT DOCUMENTS

| | | | |
|---|---|---|---|
| 47-2429 | 1/1972 | Japan | 423/629 |
| 443682 | 9/1975 | U.S.S.R. | 210/732 |
| 596545 | 3/1978 | U.S.S.R. | 423/629 |

OTHER PUBLICATIONS

"Alum Recovery for Filtration Plant, Water and Wastes Engineering", Fulton, pp. 78-81.

*Primary Examiner*—Ernest G. Therkorn
*Attorney, Agent, or Firm*—Flynn, Thiel, Boutell & Tanis

[57] ABSTRACT

An aqueous slurry of a water-insoluble or slightly water-soluble metal hydroxide can be effectively filtrated and dehydrated by adding an anionic surfactant of the following formula (I):

$$R-O-AO-_nX \qquad (I)$$

wherein R represents an alkyl or alkenyl group of 8-24 carbon atoms, A represents an alkyene group of 2-4 carbon atoms, X represents $SO_3M$ (M being H, K, Na or $NH_4$), $PO_3M$ (M being K or Na) or $CH_2COOM$ (M being K or Na), and n represents an interger of 1-100, to the aqueous slurry of the metal hydroxide or to the washing water.

14 Claims, No Drawings

AGENT FOR PROMOTING FILTRATION DEHYDRATION OF METAL HYDROXIDE SLURRY

The present invention relates to an agent for promoting filtration dehydration of an aqueous slurry of a water-insoluble metal hydroxide (including also a slightly water-soluble metal hydroxide) and a dehydration process using the same. More particularly, the present invention relates to an agent for promoting filtration dehydration comprising an anionic surfactant which is used for removing water from an aqueous slurry of water-insoluble metal hydroxide particles in an efficient, economically advantageous manner.

An aqueous slurry of a water-insoluble or slightly water-soluble metal hydroxide can be effectively filtered and dehydrated by adding an anionic surfactant of the following formula (I):

$$R-O(-A\ O-)_n X \qquad (I)$$

wherein R represents an alkyl or alkenyl group of 8–24 carbon atoms, A represents an alkylene group of 2–4 carbon atoms, X represents $SO_3M$ (M being H, K, Na or $NH_4$), $PO_3M$ (M being K or Na) or $CH_2COOM$ (M being K or Na), and n represents an integer of 1–100, to the aqueous slurry of the metal hydroxide or to the washing water.

Generally, wet, water-insoluble metal hydroxide particles contain a considerable quantity of water even after dehydration by filtration, though the water content thereof varies depending on the kinds of metal, production conditions, particle size, shape of the particles, surface conditions thereof and filtration conditions. Particularly, metal hydroxides, obtained by precipitation effected by making metal salt solutions alkaline, contain large quantities of water and have variable compositions in many cases. Such metal hydroxides are frequently treated by a vacuum (reduced pressure) filtration dehydration process. However, the dehydrated metal hydroxides still contain considerable quantities of water. For example, when an aqueous slurry of aluminum hydroxide is dehydrated by the vacuum filtration dehydration process, the resulting aluminum hydroxide cake has generally a water content of about 8–16 wt.%. The wet metal hydroxides after the filtration dehydration are put on the market as they are or, in many cases, they are further burned to form metal oxides. However, water contained in the wet metal hydroxides causes disadvantages such as reduction in commercial value of the products due to disproportionation of water during storage and an increase in the transportation cost. When the wet metal hydroxides are to be burned into the corresponding metal oxides, the fuel cost in the burning step is increased unfavorably due to the heat of evaporation of water contained therein. Energy cost is an important problem, since production costs have sharply been increased by the recent increase in fuel costs.

Under these circumstances, it is desired to further reduce the water content of a metal hydroxide efficiently in an inexpensive way in the filtration dehydration step of an aqueous slurry of the metal hydroxide. For example, physical improvements in filtration devices and filters have been proposed. As a matter of course, it is desirable that the dehydration efficiency be further enhanced by the addition of an additive.

After intensive investigations made under these circumstances, the inventors have found that, in the filtration dehydration of an aqueous slurry of water-insoluble or slightly water-soluble metal hydroxide, the water content thereof can be reduced efficiently and economically advantageously by adding an anionic surfactant of the following general formula (I) thereto:

$$R-O(-AO)_n-X \qquad (I)$$

wherein R represents an alkyl or alkenyl group of 8–24 carbon atoms, preferably 12–20 carbon atoms, A represents an alkylene group of 2–4 carbon atoms, preferably 3–4 carbon atoms, X represents $SO_3M$ (M being H, K, Na or $NH_4$), $PO_3M$ (M being K or Na) or $CH_2COOM$ (M being K or Na), and n represents an integer of 1–100, preferably 3–15.

The surfactants of above formula (I) may be prepared by, for example, the following process.

To an alcohol of the formula:

$$R-OH \qquad (II)$$

wherein R has the same meaning as above is added an alkylene oxide of 2–4 carbon atoms in the presence of a catalyst such as an alkali to form a compound of the formula:

$$R-O(-AO)_n-H \qquad (III)$$

wherein R, A and n have the same meanings as above. As the alkylene oxide, propylene oxide and butylene oxide may be used either alone or in the form of a mixture thereof. In case the mixture is used, either a block or random addition process may be employed. When ethylene oxide is used alone as the alkylene oxide, the degree of the dehydration is slightly inferior. When up to 80 molar %, preferably up to 40 molar %, of ethylene oxide is used in combination with propylene oxide and/or butylene oxide, effects by no means inferior to those obtained by using propylene oxide and/or butylene oxide can be obtained. When propylene oxide or butylene oxide is used as the alkylene oxide, degree of foaming is lower than that observed when ethylene oxide is used, and this is practically preferred. As the starting alcohols, ones having 8–24 carbon atoms may be used. Among these, those having 12–20 carbon atoms, particularly 14–18 carbon atoms, are preferred from the viewpoint of the effects thereof. Both natural and synthetic alcohols having straight or branched chains may be used. As for the amount of the alkylene oxide, the effects thereof are obtained with about 1–100 moles thereof. The alkylene oxide is preferably used in an amount of about 3–15 moles, particularly about 3–10 moles.

A compound of the above general formula (III) is then subjected to a sulfuric acid esterification reaction, phosphoric acid esterification reaction or carboxymethylation reaction and, if necessary, further to a neutralization reaction to obtain an intended anionic surfactant of the above formula (I). In the sulfuric acid esterification reaction, the compound (III) is reacted generally with a sulfating agent such as sulfamic acid, sulfuric acid (including fuming sulfuric acid), chlorosulfuric acid or sulfur trioxide. In the phosphoric acid esterification reaction, the compound (III) is reacted generally with a phosphating agent such as phosphorus pentoxide. In the carboxymethylation reaction, the compound (III) is reacted generally with monochloroacetic acid or the like. If necessary, the reaction mixture is neutralized with a base such as sodium hydroxide, potassium hydroxide or aqueous ammonia. As for the degree of esterification, 100% esterification is not always necessary, and a degree of at least about 80% is sufficient. It has been found that effects of X in the above general formula (I) are in the order of $CH_2COOM < PO_3M < SO_3M$.

The above process for the production of surfactants of general formula (I) is the most typical process. Surfactants (I) produced by other processes have similar effects as a matter of course.

As the water-insoluble or slightly water-soluble metal hydroxides to which the agent of the present invention may be applied, there may be mentioned Group II-A metal hydroxides such as magnesium hydroxide, calcium hydroxide, strontium hydroxide and barium hydroxide; Group III-A metal hydroxides such as aluminum hydroxide, gallium hydroxide and indium hydroxide; Group IV-A metal hydroxides such as germanium hydroxide, tin hydroxide and lead hydroxide; Group VIII metal hydroxides such as iron hydroxide, cobalt hydroxide and nickel hydroxide; Group II-B metal hydroxides such as zinc hydroxide; and Group IV-B metal hydroxides such as titanium hydroxide. Those metal hydroxide particles have particle diameters of approximately 0.1–1000$\mu$. These particles may be coagulated to form larger, porous particles.

The agent of the present invention for promoting filtration dehydration may be used in the filtration dehydration step of the aqueous slurry of the metal hydroxide, may be added in a given concentration to the aqueous slurry prior to the final filtration dehydration step or may be added to a washing water. For example, when a slurry of a metal hydroxide in a production process liquid is directly dehydrated by filtration to form a filter cake, the filtration dehydration-promoting agent may be added to said liquid. Alternatively, when the wet filter cake obtained by the filtration dehydration is to be washed with water and subjected again to the filtration dehydration, the filtration dehydration-promoting agent may be added to the washing water. Generally, a process liquid in the production of a metal hydroxide has a high ion strength, is an alkaline aqueous solution and has a high salt concentration in many cases. Therefore, it is advantageous to add the above agent to washing water which is purified water or the like.

The amount of the agent of the present invention for promoting filtration dehydration to be added to the aqueous metal hydroxide slurry is variable depending on the metal hydroxide, particle size distribution, particle surface conditions and filtration dehydration conditions. With about 10–1000 ppm of said agent per unit weight of the dry metal hydroxide, a water content reduction rate of up to about 60% can be obtained (see the Example given below). In view of the effects and economic advantages, the amount is preferably about 100–500 ppm. The results of the inventors' experiments have revealed that the dehydration-promoting effect is enhanced as the amount of the surfactant (I) is increased in the initial stages, but once saturation in concentration has been attained, the dehydration-promoting effect is rather instead reduced as the amount thereof is increased. A reason for this is considered to be as follows. Before saturation in concentration has been attained, the major part of the molecules of the filtration dehydration-promoting agent are adsorbed on the surfaces of the metal hydroxide particles in the monomolecular form to make the surfaces hydrophobic, thereby facilitating the dehydration. On the other hand, if the concentration is higher than the saturation level, superfluous molecules are eluted out into the filtrate, and in a far higher concentration region, dimolecular adsorption proceeds partially and the particles are again made hydrophilic, thereby reducing the dehydration-promoting effect. Therefore, if the filtration dehydration-promoting agent is used in an amount slightly smaller than a suitable amount (i.e. saturated adsorption amount), this agent is hardly eluted out into the filtrate and foaming can be controlled. Accordingly, if said agent is used in a closed system wherein the filtrate is circulated, the accumulation of the agent in the liquid is small in amount even after use for a long period of time. Particularly, the filtration dehydration-promoting agent of the present invention is characterized in that it has a saturation concentration lower than other such agents and, therefore, the dehydrating effect can be obtained with a smaller amount thereof (see the following Example). In the filtration dehydration of an aqueous slurry of metal hydroxide, the dehydration is promoted by suction of the filtrate to effect the filtration under reduced pressure (vacuum), or alternatively, the dehydration is promoted by compression from above. The filtration dehydration-promoting agent of the present invention may be used in both of the above processes. If the metal hydroxide particles are fine, they may be used together with an ordinary high molecular coagulant such as polyacrylamide or a partial hydrolyzate thereof.

The following example further illustrates the present invention, but by no means limits the invention.

EXAMPLE 100 ml. of 1 M aqueous sodium hydroxide solution was mixed with 60 g of aluminum hydroxide. The mixture was stirred at a given rotation rate for 60 seconds and poured on a Buchner funnel provided with a filter having a diameter of 7 cm (No. 2 filter paper of Toyo Roshi Co.). After allowing the mixture to stand for 30 seconds, filtration under suction and aeration were effected under a reduced pressure of 500 mmHg for three minutes. Then, 100 ml. of washing water (distilled water) containing a given amount of a filtration dehydration-promoting agent was poured on the filter cake and the suction filtration and aeration were further effected under a reduced pressure of 500 mmHg for three minutes. 50 g of the wet aluminum hydroxide cake obtained by the above filtration dehydration was weighed and dried at 110° C. and constant weight (weight of the dry cake) thereof was determined. The water content of aluminum hydroxide after the filtration dehydration and the reduction amount of water content are calculated according to the following formulae:

$$\text{Water content (wt. \%)} = \left(1 - \frac{\text{Weight of dry cake}}{\text{Weight of wet cake}}\right) \times 100$$

Reduction amount of water content (%) =

$$\left(1 - \frac{\text{Water content of the cake treated with the dehydration-promoting agent}}{\text{Water content of blank cake}}\right) \times 100$$

Table 1 shows the results of tests wherein 100 ppm (by weight), based on aluminum hydroxide powder, of various dehydration-promoting agents were added and also the results of blank tests wherein the dehydration-promoting agents were not used.

Table 2 shows the results of tests wherein dependencies of the capacities of dehydration-promoting agents used in Run Nos. 26, 63, 67 and 69 on concentrations thereof were examined. In the filtration dehydration tests, given amounts of the dehydration-promoting agents were added to washing water at 90° C. In addition, foam volumes (cm³) on the filtrates immediately after the filtration dehydration are also shown as foaming properties.

TABLE 1

| Run No. | Dehydration-promoting agent | Water content (wt %) | Water content reduction amount (%) |
|---|---|---|---|
| 1 | Blank | 12.0 | 0 |
| 2 | $C_{12}H_{25}O(C_2H_4O)_3SO_3Na$ | 8.4 | 30 |
| 3 | $C_{12}H_{25}O(C_2H_4O)_6SO_3Na$ | 7.5 | 38 |
| 4 | $C_{12}H_{25}O(C_2H_4O)_{10}SO_3Na$ | 8.2 | 32 |
| 5 | $C_{12}H_{25}O(C_2H_4O)_{15}SO_3Na$ | 8.7 | 28 |
| 6 | $C_{12}H_{25}O(C_2H_4O)_{50}SO_3Na$ | 10.9 | 9 |
| 7 | $C_{16}H_{33}O(C_2H_4O)_3SO_3Na$ | 7.3 | 39 |
| 8 | $C_{16}H_{33}O(C_2H_4O)_6SO_3Na$ | 7.0 | 42 |
| 9 | $C_{16}H_{33}O(C_2H_4O)_{10}SO_3Na$ | 7.5 | 38 |
| 10 | $C_{16}H_{33}O(C_2H_4O)_{15}SO_3Na$ | 8.3 | 31 |
| 11 | $C_{16}H_{33}O(C_2H_4O)_{50}SO_3Na$ | 10.1 | 16 |
| 12 | $C_{20}H_{41}O(C_2H_4O)_{10}SO_3Na$ | 8.1 | 33 |
| 13 | $C_{12}H_{25}O(C_3H_6O)_3SO_3Na$ | 6.2 | 48 |
| 14 | $C_{12}H_{25}O(C_3H_6O)_6SO_3Na$ | 5.8 | 52 |
| 15 | $C_{12}H_{25}O(C_3H_6O)_{10}SO_3Na$ | 6.5 | 49 |
| 16 | $C_{12}H_{25}O(C_3H_6O)_{15}SO_3Na$ | 7.9 | 34 |
| 17 | $C_{12}H_{25}O(C_3H_6O)_{50}SO_3Na$ | 9.3 | 23 |
| 18 | $C_{12}H_{25}O(C_3H_6O)_{100}SO_3Na$ | 10.4 | 13 |
| 19 | $C_{14}H_{29}O(C_3H_6O)_3SO_3Na$ | 5.8 | 52 |
| 20 | $C_{14}H_{29}O(C_3H_6O)_6SO_3Na$ | 5.4 | 55 |
| 21 | $C_{14}H_{29}O(C_3H_6O)_{10}SO_3Na$ | 6.1 | 49 |
| 22 | $C_{14}H_{29}O(C_3H_6O)_{15}SO_3Na$ | 7.5 | 38 |
| 23 | $C_{14}H_{29}O(C_3H_6O)_{50}SO_3Na$ | 8.7 | 28 |
| 24 | $C_{14}H_{29}O(C_3H_6O)_{100}SO_3Na$ | 9.9 | 18 |
| 25 | $C_{16}H_{33}O(C_3H_6O)_3SO_3Na$ | 5.4 | 55 |
| 26 | $C_{16}H_{33}O(C_3H_6O)_6SO_3Na$ | 5.0 | 58 |
| 27 | $C_{16}H_{33}O(C_3H_6O)_{10}SO_3Na$ | 5.8 | 52 |
| 28 | $C_{16}H_{33}O(C_3H_6O)_{15}SO_3Na$ | 7.0 | 42 |
| 29 | $C_{16}H_{33}O(C_3H_6O)_{50}SO_3Na$ | 8.3 | 31 |
| 30 | $C_{16}H_{33}O(C_3H_6O)_{100}SO_3Na$ | 9.5 | 21 |
| 31 | $C_{18}H_{37}O(C_3H_6O)_3SO_3Na$ | 5.7 | 53 |
| 32 | $C_{18}H_{37}O(C_3H_6O)_6SO_3Na$ | 5.2 | 57 |
| 33 | $C_{18}H_{37}O(C_3H_6O)_{10}SO_3Na$ | 6.0 | 50 |
| 34 | $C_{18}H_{37}O(C_3H_6O)_{15}SO_3Na$ | 7.3 | 39 |
| 35 | $C_{18}H_{37}O(C_3H_6O)_{50}SO_3Na$ | 8.5 | 29 |
| 36 | $C_{18}H_{37}O(C_3H_6O)_{100}SO_3Na$ | 9.7 | 19 |
| 37 | $C_{20}H_{41}O(C_3H_6O)_{10}SO_3Na$ | 7.5 | 38 |
| 38 | $C_{12}H_{25}O(C_4H_8O)_3SO_3Na$ | 6.3 | 48 |
| 39 | $C_{12}H_{25}O(C_4H_8O)_6SO_3Na$ | 6.0 | 50 |
| 40 | $C_{12}H_{25}O(C_4H_8O)_{10}SO_3Na$ | 6.7 | 44 |
| 41 | $C_{12}H_{25}O(C_4H_8O)_{50}SO_3Na$ | 9.7 | 19 |
| 42 | $C_{14}H_{29}O(C_4H_8O)_3SO_3Na$ | 5.9 | 51 |
| 43 | $C_{14}H_{29}O(C_4H_8O)_6SO_3Na$ | 5.6 | 53 |
| 44 | $C_{14}H_{29}O(C_4H_8O)_{10}SO_3Na$ | 6.2 | 48 |
| 45 | $C_{14}H_{29}O(C_4H_8O)_{50}SO_3Na$ | 9.0 | 25 |
| 46 | $C_{16}H_{33}O(C_4H_8O)_3SO_3Na$ | 5.3 | 56 |
| 47 | $C_{16}H_{33}O(C_4H_8O)_6SO_3Na$ | 5.1 | 58 |
| 48 | $C_{16}H_{33}O(C_4H_8O)_{10}SO_3Na$ | 5.9 | 51 |
| 49 | $C_{16}H_{33}O(C_4H_8O)_{50}SO_3Na$ | 8.7 | 28 |
| 50 | $C_{18}H_{37}O(C_4H_8O)_3SO_3Na$ | 5.9 | 51 |
| 51 | $C_{18}H_{37}O(C_4H_8O)_6SO_3Na$ | 5.4 | 55 |
| 52 | $C_{18}H_{37}O(C_4H_8O)_{10}SO_3Na$ | 6.3 | 43 |
| 53 | $C_{18}H_{37}O(C_4H_8O)_{50}SO_3Na$ | 8.8 | 27 |
| 54 | $C_{20}H_{41}O(C_4H_8O)_{10}SO_3Na$ | 7.7 | 36 |
| 55 | $C_{16}H_{33}O(C_3H_6O)_6SO_3K$ | 4.9 | 59 |
| 56 | $C_{16}H_{33}O(C_3H_6O)_6SO_3NH_4$ | 5.1 | 58 |
| 57 | $C_{16}H_{33}O(C_3H_6O)_6PO_3Na$ | 5.5 | 54 |
| 58 | $C_{16}H_{33}O(C_3H_6O)_6PO_3K$ | 5.4 | 55 |
| 59 | $C_{16}H_{33}O(C_3H_6O)_6CH_2COONa$ | 6.1 | 49 |
| 60 | $C_{16}H_{33}O(C_3H_6O)_6CH_2COOK$ | 6.0 | 50 |
| 61 | $C_{12}H_{25}O(C_3H_6O)_5(C_2H_4O)_3SO_3Na$ | 5.3 | 56 |
| 62 | $C_{12}H_{25}O(C_3H_6O)_3(C_2H_4O)_5SO_3Na$ | 6.2 | 48 |
| Comparative Examples | | | |
| 63 | $C_{12}H_{25}OSO_3Na$ | 10.8 | 10 |
| 64 | $C_9H_{19}O(C_2H_4O)_{13}H$ | 11.8 | 2 |
| 65 | $C_{16}H_{33}O(C_2H_4O)_7H$ | 11.3 | 6 |
| 66 | $C_{16}H_{33}O(C_2H_4O)_{13}H$ | 11.4 | 5 |
| 67 | $C_{16}H_{33}O(C_2H_4O)_{20}H$ | 11.5 | 4 |
| 68 | $C_{12}H_{25}O(C_2H_4O)_7H$ | 11.1 | 8 |
| 69 | $C_{12}H_{25}O(C_2H_4O)_{20}H$ | 11.3 | 6 |

TABLE 2

| | Dehydration-promoting agent | Amount (ppm) | Water content (wt %) | Water content reduction amount (%) | Foaming property (cm³) |
|---|---|---|---|---|---|
| Present invention | $C_{16}H_{33}O(C_3H_6O)_6SO_3Na$ | 25 | 10.5 | 13 | 2 |
| | " | 50 | 7.7 | 36 | 5 |
| | " | 100 | 5.0 | 58 | 10 |
| | " | 200 | 4.8 | 60 | 70 |
| | " | 500 | 5.3 | 56 | 120 |
| | " | 1000 | 6.4 | 47 | 150 |
| Control | None | — | 12.0 | 0 | 0 |
| | $C_{12}H_{25}OSO_3Na$ | 25 | 11.5 | 4 | 10 |
| | " | 50 | 11.3 | 6 | 20 |
| | " | 100 | 10.8 | 10 | 50 |
| | " | 200 | 8.5 | 29 | 110 |
| | " | 500 | 6.9 | 43 | 270 |
| | " | 1000 | 7.2 | 40 | 450 |
| | $C_{12}H_{25}O(C_2H_4O)_{20}H$ | 100 | 11.3 | 6 | — |
| | " | 400 | 7.5 | 38 | — |
| | $C_{16}H_{33}O(C_2H_4O)_{20}H$ | 100 | 11.5 | 4 | — |
| | " | 400 | 7.9 | 34 | — |

The embodiments of the invention in which an exclusive property or privilege is claimed are defined as follows:

1. A process for dewatering an aqueous slurry of a water-insoluble metal hydroxide or a slightly water-soluble metal hydroxide, comprising: adding to the slurry, as a dewatering aid, an effective amount of an anionic surfactant having the formula $$R-O-(AO-)_nX$$

wherein n is an integer of from 1 to 100, R is alkyl or alkenyl having from 8 to 24 carbon atoms, A is alkylene having from 2 to 4 carbon atoms, and X is $SO_3M$, $PO_3M_1$, or $CH_2COOM_1$, M is H, K, Na or $NH_4$ and $M_1$ is K or Na, so that said anionic surfactant is adsorbed on the surfaces of the metal hydroxide particles to render said surfaces hydrophobic, and then filtering said aqueous slurry to obtain a wet filter cake containing said metal hydroxide.

2. A process as claimed in claim 1, wherein said water-insoluble or water-slightly soluble metal hydroxide is aluminum hydroxide.

3. A process as claimed in claim 2, wherein said anionic surfactant is added in an amount of from 10 to 1000 ppm per unit weight of said metal hydroxide, calculated on a dry basis.

4. A process as claimed in claim 3, wherein A is alkylene having 3 or 4 carbon atoms.

5. A process as claimed in claim 1, wherein said anionic surfactant is added in an amount of from 100 to 500 ppm per unit weight of said metal hydroxide, calculated on a dry basis.

6. A process as claimed in claim 1, wherein R has from 12 to 20 carbon atoms, and n is in the range of from 3 to 15.

7. A process as claimed in claim 1, wherein R has from 14 to 18 carbon atoms, and n is in the range of from 3 to 10.

8. A process for dewatering an aqueous slurry of a water-insoluble metal hydroxide or a slightly water-soluble metal hydroxide, comprising: filtering said slurry to obtain a first wet filter cake containing said metal hydroxide; then washing said first wet filter cake with washing water containing, as a dewatering aid, an anionic surfactant having the formula

wherein n is an integer of from 1 to 100, R is alkyl or alkenyl having from 8 to 24 carbon atoms, A is alkylene having from 2 to 4 carbon atoms, and X is $SO_3M$, $PO_3M_1$, or $CH_2COOM_1$ wherein M is H, K, Na or $NH_4$ and $M_1$ is K or Na to incorporate in said first wet filter cake an effective amount of said anionic surfactant so that said anionic surfactant is adsorbed on the surfaces of the metal hydroxide particles to render said surfaces hydrophobic, and then again filtering said first wet filter cake containing said surfactant to obtain a second wet filter cake containing said metal hydroxide.

9. A process as claimed in claim 8, wherein the amount of said anionic surfactant is from 10 to 1000 ppm per unit weight of said metal hydroxide, calculated on a dry basis.

10. A process as claimed in claim 8, wherein A is alkylene having 3 or 4 carbon atoms.

11. A process as claimed in claim 8, wherein the amount of said surfactant is from 100 to 500 ppm per unit weight of said metal hydroxide, calculated on a dry basis.

12. A process as claimed in claim 8, wherein R has from 12 to 20 carbon atoms and n is in the range of from 3 to 15.

13. A process as claimed in claim 8, wherein R has from 14 to 18 carbon atoms and n is from 3 to 10.

14. A process as claimed in claim 8 in which said metal hydroxide is aluminum hydroxide.

* * * * *